United States Patent Office 3,297,316
Patented Jan. 10, 1967

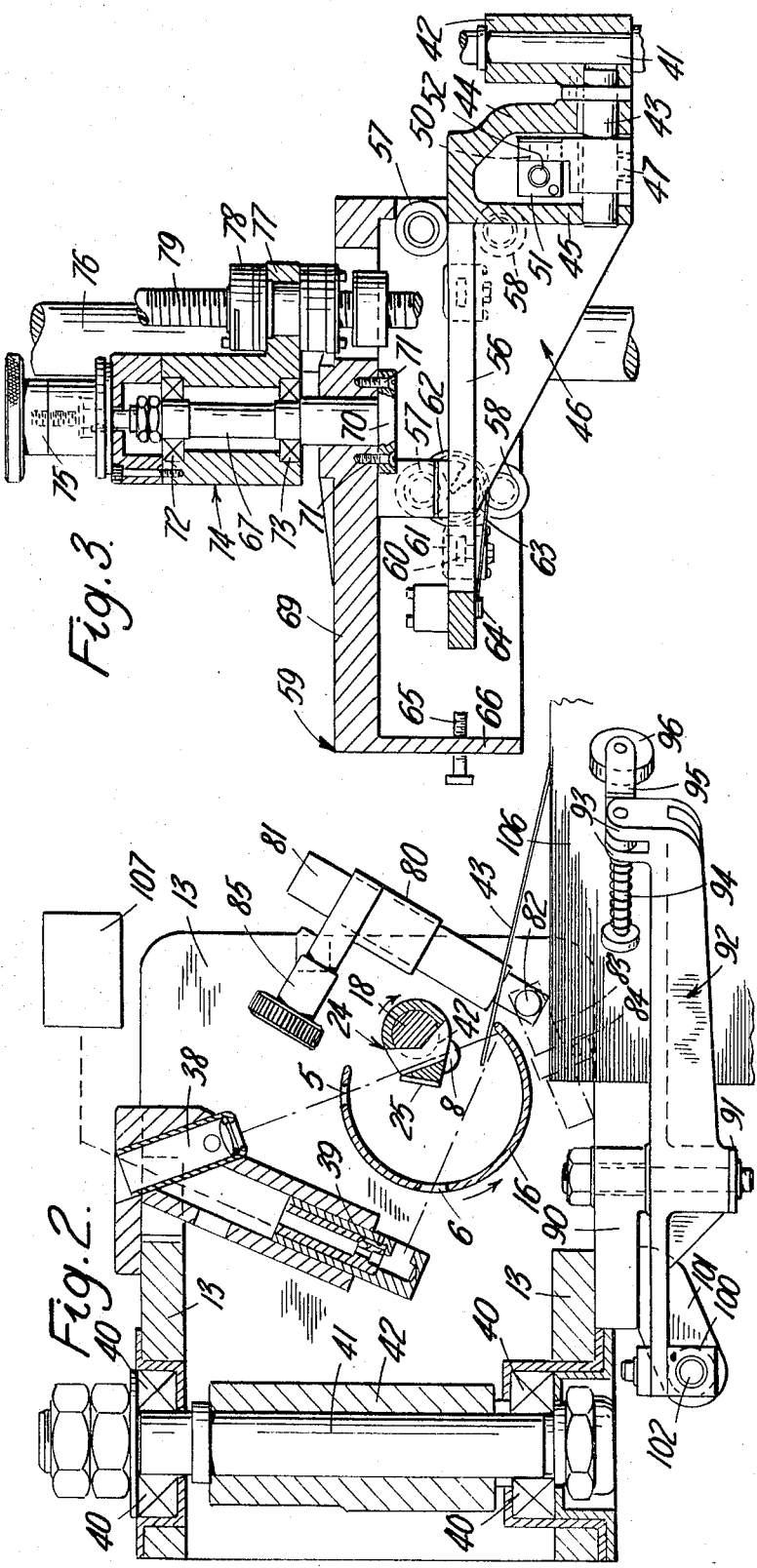

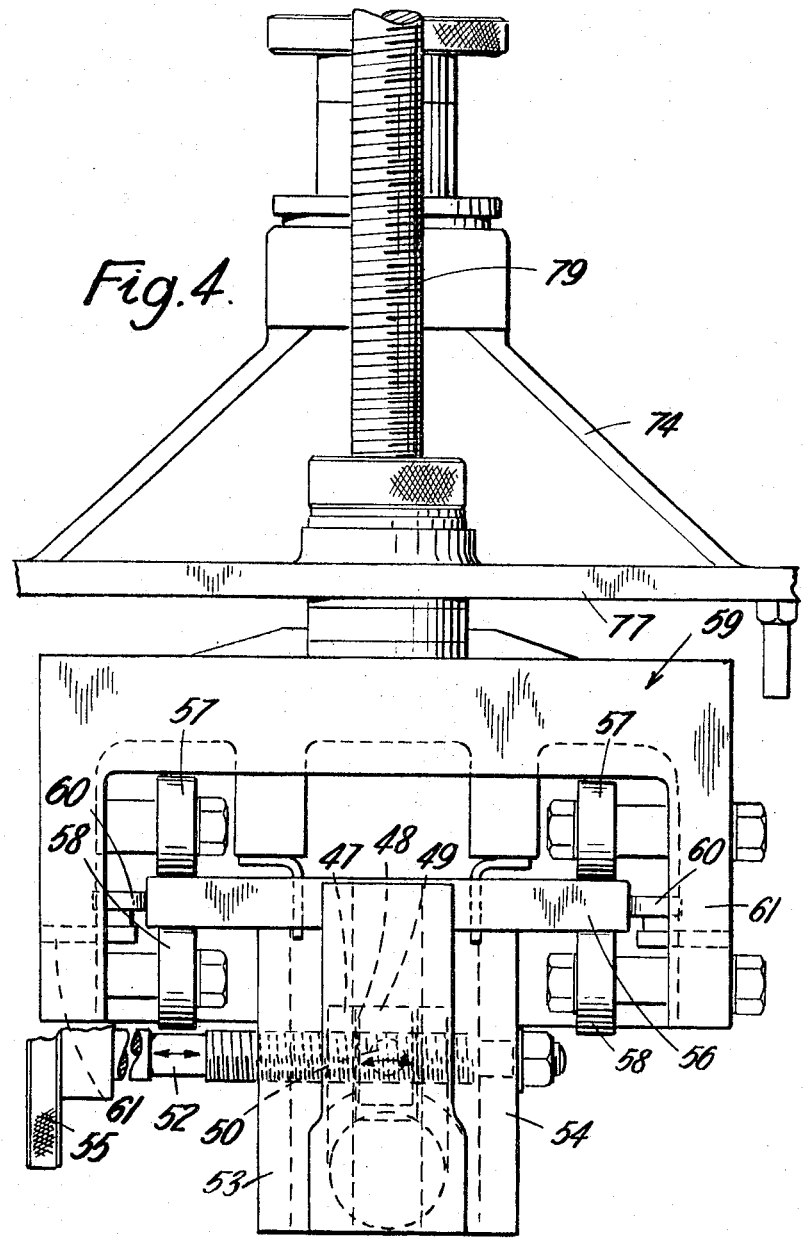

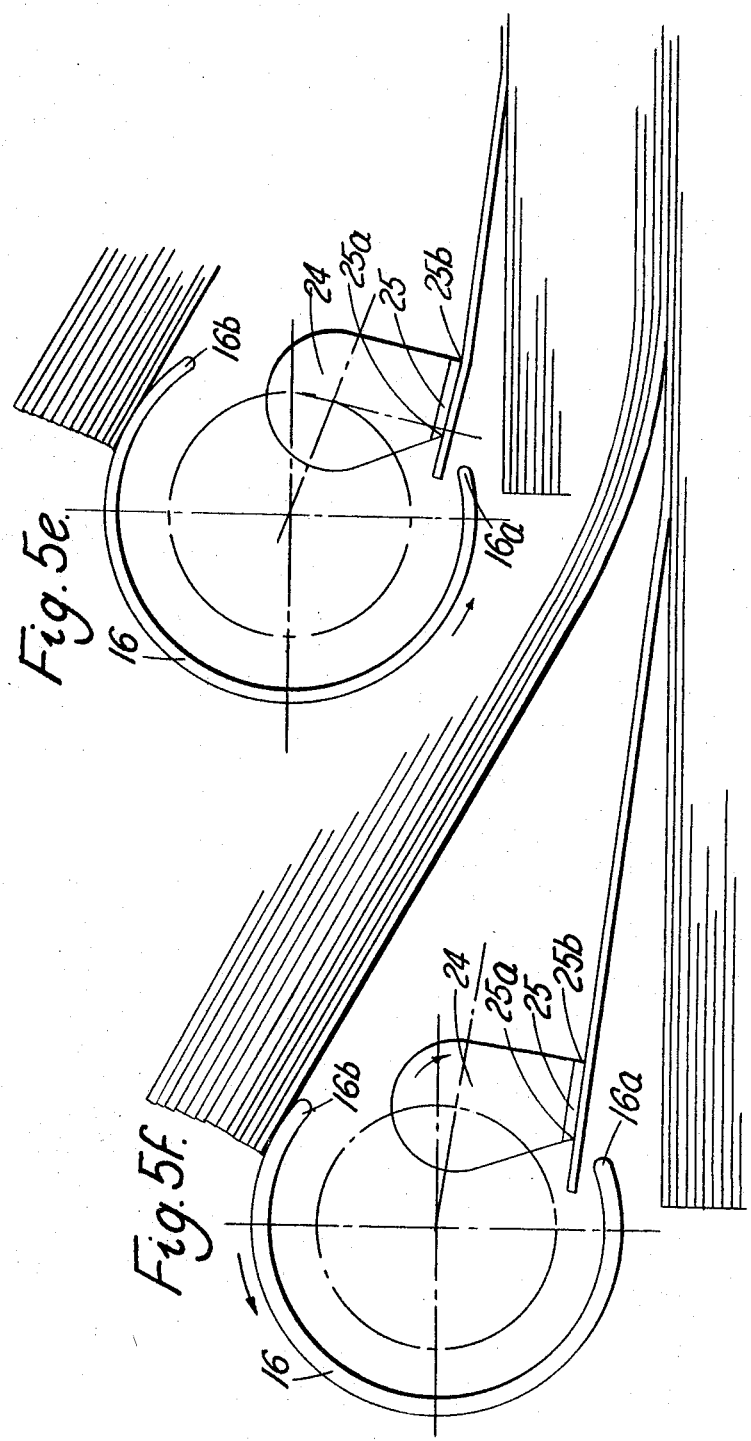

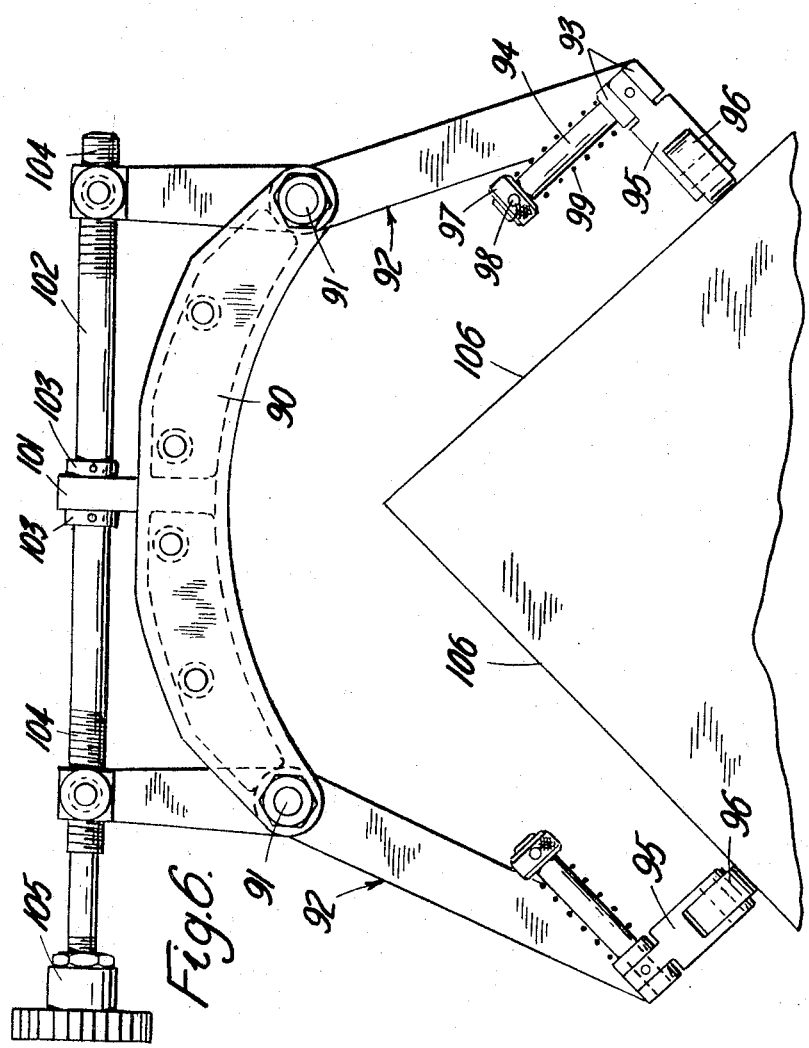

3,297,316
SHEET SEPARATING APPARATUS
Sidney Haines, Dovercourt, England, assignor to
Vacuumatic Limited, Harwich, England
Filed July 15, 1964, Ser. No. 382,725
Claims priority, application Great Britain, July 16, 1963,
28,191/63
16 Claims. (Cl. 271—27)

This invention relates to apparatus for successively separating at least a part of each of a number of sheets from a neighbouring sheet in a stack and particularly to apparatus for counting sheets whilst maintaining a stack by successively deflecting the sheets.

One of the objects of the invention is to prevent one sheet from sticking to another when the latter sheet is being deflected.

According to this invention an apparatus of the kind provided with a rotatable suction device having a part therewith which may project between adjacent sheets in the stack and has a suction opening which during a part of the rotation causes a sheet to cling to the suction device and to be deflected away from an adjacent sheet to form a gap and with means for maintaining said gap until the suction opening enters the gap causing the aforesaid adjacent sheet to be deflected from the next sheet and so on, is characterised in that the suction device is mounted on a carrier to rotate about an axis parallel to the planes of the sheets, which carrier is itself mounted to rotate about an axis parallel to and displaced from the first said axis.

The suction device may be formed with an edge extending in the same general direction as said axes and wherein means are provided for imparting rotation to said carrier and to said suction device about their axes in such a direction and such a speed that when the suction device moves the sheet away from a neighbouring sheet it also bends the sheet at the locality of said edge.

In a preferred arrangement said suction device is rotated relatively to the carrier in the opposite sense to the rotation of the carrier itself.

The carrier for said suction device may comprise a shaft having fixed to it a pinion engageable with a gear wheel concentric with the axis about which the carrier rotates.

Preferably said gear wheel comprises an internally toothed rack. The gear ratio between the gear wheel and pinion is such that the pinion is rotated twice about its axis as it executes one revolution around the gear wheel.

Preferably said gear wheel is stationary and is adjustable about its axis on a fixed part of the apparatus, whereby the extent of bending of a sheet consequent upon the compound movement of the suction device may be varied. This is a desirable feature where sheets of different rigidity are being dealt with. In the case of thin and flexible sheets considerable flexure is required in order to separate two sheets which may be adhering together, whereas with thicker and more rigid sheets the extent of deflection required to achieve separation is considerably smaller. In addition, in the case of more rigid sheets, the extent of deflection must be kept small in order that the resilience of a sheet may not bring it away from the suction device before the gap maintaining means can come into operation.

In one arrangement according to the invention the means for maintaining said gap comprises a slotted drum mounted to rotate about the same axis about which the carrier rotates and through which slot the suction device may project. One edge of this slot is arranged to engage one side of the corner of a deflected sheet so as to maintain said gap whilst said suction device is rotating away from the other side of the deflected sheet and into the gap on said one side of the sheet opposite the corner of the next sheet to be deflected.

Rotary valve means are associated with the suction device, which valve means are automatically actuated by rotation of one of said parts so that the suction device is placed into communication with a source of suction when it has been brought opposite with one of the sheets and is cut off from communication with the source when the sheet has been deflected and said means for maintaining the gap have come into operation.

In the case where the sheets remain in a stack whilst parts thereof are being deflected means are provided for operating a counter once during each cycle of the above operation.

The above features and other features of the invention are set out in the following description of an apparatus for counting comparatively stiff sheets, such as cardboard, reference being made to the accompanying drawings in which:

FIGURE 2 is a largely diagrammatic view looking from the left of FIGURE 1;

FIGURE 3 is a vertical section through a carrier for the sheet deflecting head shown in FIGURES 1 and 2;

FIGURE 4 is a view looking from the right of FIGURE 3;

FIGURES 5a to 5f are diagrammatic views of the relative positions of the suction device and the gap maintaining means during a part of a cycle of movement; and FIGURE 6 is a plan view of the roller guide mechanism for the counter head.

Figure 1:
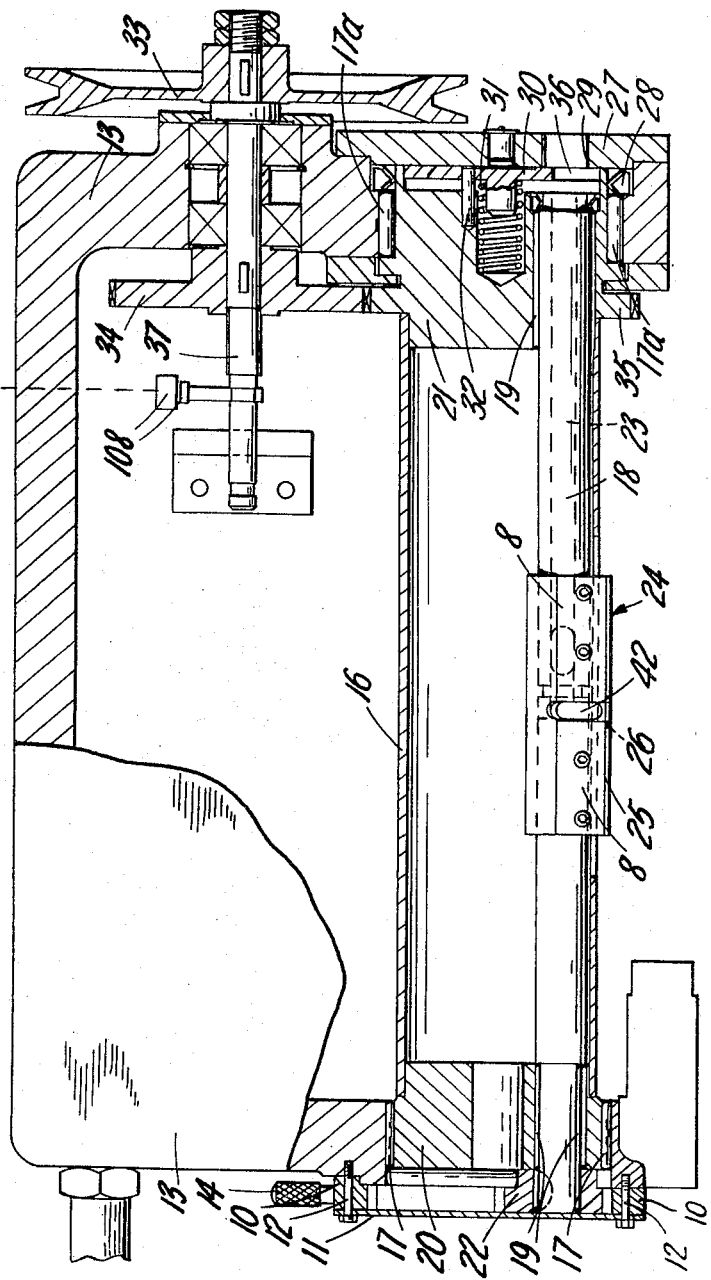
FIGURE 1 is a section through a sheet deflecting head comprising a suction device and means for maintaining the gaps between the corners of adjacent sheets.

Referring to FIGURE 1 there is provided an internally toothed annulus 10 having secured thereto a circular cover plate 11. The annulus and cover plate are formed with two diametrically opposed arcuate slots through which pass clamping bolts 12, whereby the annulus and cover plate are adjustably secured to the main body 13 of a sheet deflecting head which is arranged, in a manner to be described later, to be movable from the top to the bottom of a stack of sheets. To facilitate the adjustment of the annulus 10 it is provided with a manipulating member 14, and a pointer (not shown) on the cover plate 11 cooperates with an arcuate scale (also not shown) on the body 13.

The toothed annulus 10 is mounted concentrically with respect to a drum 16 which is rotatable in bearings 17, 17a, in the main body 13 of the head. A spindle 18 is rotatably mounted in bearings 19 in end members 20 and 21 of the drum. To one end of the spindle 18 is secured a pinion 22 which meshes with the internally toothed annulus 10, the annulus having twice as many teeth as the pinion 22. The end of the spindle 18 remote from the pinion 22 is drilled to form an axially extending air passage 23 terminating at the centre of the spindle 18.

Attached to the centre portion of the suction spindle 18 is a suction head 24. The suction head 24 has secured thereto a plate 25 having a suction hole 26 formed in it and communicating with the air passage 23. As explained later the spindle 18 is rotatable within the drum 16 and the distance of the trailing edge of the plate 25 from the axis of the spindle 18 is substantially equal to the pitch circle radius of the pinion 22.

The drum 16 is cut away around part of its circumference, as best seen in FIGURE 2 to permit the suction head 24 and the plate 25 to project from the drum during part of the rotation of the spindle 18 relatively to the drum. The drum end member 21 rotates in the aforementioned bearing 17a in a housing in the head 13, which housing is closed by a cover plate 27 and a seal 28 is disposed between the cover plate and the bearing 17a. The cover plate 27 is formed with a threaded hole 29 into which is screwed one end of a pipe (not shown) leading to a source of suction, also not shown. A ported disc valve 30 is pressed against the cover plate by a spring 31, which disc valve is rotated with the drum 16 by means of a pin 32 which engages holes in the end member 21 of the drum and the disc valve 30 respectively, thus placing the port 26 in the suction head into and out of communication with the source of suction, whereas a port 36 in the disc valve 30 comes into and out of register with the port 29 during the rotation of the drum, and in the same position of the drum during each revolution thereof.

A shaft of an electric motor (not shown) has secured to it a pulley (also not shown) which is encircled by an endless belt which also encircles a pulley 33 secured to a shaft 37 rotatably mounted in bearings in the body of the head 13. The pulley 33 drives the drum 16 through a gear transmission 34, 35. It will be appreciated that with this arrangement rotation of the drum 16 carries with it the spindle 18, and the spindle 18 is also caused to rotate about its own axis relatively to the drum by the action of the pinion 22 rolling around the internally toothed annulus 10. Thus the suction head 24 and the plate 25 are caused during rotation of the drum to execute the movements indicated in FIGURES 5a to 5f as will be described later.

In use the drum 16 is initially arranged across the upper face of a corner of a stack of sheets and substantially parallel to that face at the aforesaid corner which may be slightly out of parallel with the main planes of the sheets. Means are provided for moving the counting head downwardly along the corners of the sheets in the stack, and means are also provided for adjusting the attitude of drum 16 with respect to the corner of the stack both in horizontal and vertical planes. Both these means will now be described.

Referring to FIGURE 2, the counter head 13 is pivotally mounted on an upright spindle 41 by means of ball bearings 40. The spindle 41 passes through and is secured to an upright member 42.

Referring now to FIGURES 3 and 4 the upright member 42 on the right hand side of FIGURE 3 is secured to one end of a horizontal spindle 43 which is rotatable in bearings in two upright parallel spaced walls 44, 45 of a carrier 46 for the counter head. Secured to the spindle 43 between the walls 44 and 45 is a block 47 which is formed in its upper part, as best seen in FIGURE 4 with a slot 48. A further block 49 engages the slot 48 and is pivotally mounted on a pivot pin 50 on a still further block 51. The still further block 51 is formed with a threaded bore which is engaged by a threaded portion of a horizontal spindle 52. The spindle 52 is rotatable in bearings in parts 53 and 54 of the carrier 46 and is formed at one end with a manipulating knob 55. It will thus be seen that by rotation of the spindle 52 the block 51 will be caused to move to the right or to the left as seen in FIGURE 4 causing the block 47 to swing clockwise or anti-clockwise whereby the counter head which is secured to the spindle 43 is also tilted clockwise or anti-clockwise. Thus by turning the manipulating knob 55 the attitude of the drum 16 on the counter head can be adjusted, with respect to the corner of the stack of sheets, in a vertical plane.

The carrier 46 on which the counter head is mounted comprises an upper horizontal apertured wall 56 opposite marginal portions of which are disposed between pairs of rollers 57, 58 rotatably mounted at opposite sides of a substantially inverted channel section supporting structure 59. Two opposite edge faces of the upper wall 56 of the carrier 46 are each engaged by two smaller rollers 60, mounted on brackets 61 on the supporting structure 59 so as to rotate about vertical axes. By means of the rollers 57, 58 and 60 the carrier 46 may move freely towards and away from the corner of the stack of sheets but is restrained, by the rollers, from movement in any other direction. There is mounted on the supporting structure 59 a known form of device known as a "Tensator" indicated generally at 62 (FIGURE 3). The device comprises a spring loaded drum around which is wound a flexible steel strip 63 which is secured at one end by means of a screw 64 to the upper horizontal wall 56 of the carrier 46.

The device is so arranged that the tension in the steel strip 63 is constant so that the carrier 46 is urged to the right in FIGURE 3 with a constant force. A stop screw 65 passes through an end wall 66 of the supporting structure and limits the leftward movement of the carrier in FIGURE 3.

The supporting structure 59 is carried by a vertical spindle 67 which extends downwardly through a bore 68 in the upper wall 69 of the supporting structure, and is formed with a circular end flange 70 which is bolted to the upper wall 69 by means of screws 71. The spindle 67 is rotatable in bearings 72, 73 in a bridging assembly 74. The upper end of the spindle projects from the top of the bridging assembly 74 and is threaded to receive a clamping member 75. The arrangement is such that when the clamping member 75 is secured down firmly the spindle 67 is held securely against rotation relatively to the bridging assembly 74, but the clamping member 75 may be unscrewed thus releasing the spindle 67 so that it may be rotated with respect to the bridging assembly 74. By this means the supporting structure 59 and hence the carrier 46 and the counter head may be rotated about a vertical axis for aligning the counter head with the corner of a stock of sheets as described later.

The bridging assembly 74 is formed at opposite ends thereof with vertical bores (not shown) which slidably engage two upright parallel spaced posts 76, only one of which is shown in FIGURE 3. A flange 77 on the bridging assembly has mounted thereon an assembly indicated generally at 78 which is in threaded engagement with a vertical lead screw 79 which is symmetrically disposed with respect to the vertical posts 76 and passes through an aperture in the horizontal wall 56. There is provided an electric motor (not shown) for rotating the lead screw 79 so that the bridging assembly may slide upwardly or downwardly along the vertical posts 76. The electric motor is a two speed motor so that after the counter head has been traversed downwardly at a certain speed along the corner of the stack of sheets to be counted, it may be returned upwardly at a faster speed so that further downward traversing action can take place.

It will be seen from FIGURES 3 and 4 that the counter head is capable of universal movement in a horizontal plane due to the articulation given by the rotation about the spindle 41 and the spindle 67. Also the position of the counter head with respect to the stack may also be adjusted in a horizontal plane by means of the arrangement of the carrier 46 on the supporting structure 69 which enables the carrier to move towards and away from the corner of the stack. Means will be described later for adjusting the attitude of the counter in a horizontal plane while the apparatus is in operation.

The attitude of the counter head may also be adjusted in a vertical plane by tilting the counter head about the horizontal axis of the spindle 43 as described above.

During each operation of the apparatus to count a sheet in a stack the suction head 24 and the plate 25 are caused to execute the movements indicated in FIGURES 5a to 5f.

It will be noted from these figures that the suction head 24 is rotating in the opposite sense to the drum 16. As will also be seen from these figures the underface of the plate 25 is initially tilted in relation to the upper face of a sheet, its leading edge 25a approaching the sheet first. The underface of the plate 25 then comes flat against the face of the sheet whereafter the rotation of the drum tends to move the suction head bodily upwardly away from the sheet, but the opposite rotation of the suction head tends to move the trailing edge 25b towards the stack thus bending the sheet about the edge 25b (as best seen in FIGURES 5d and 5e). Thus the compound movement of the suction chamber has the effect of giving a substantial bend to the sheet and should an undersheet be adhering to it this substantial bend has the effect of freeing the undersheet which drops back on to the stack.

Figure 5A:
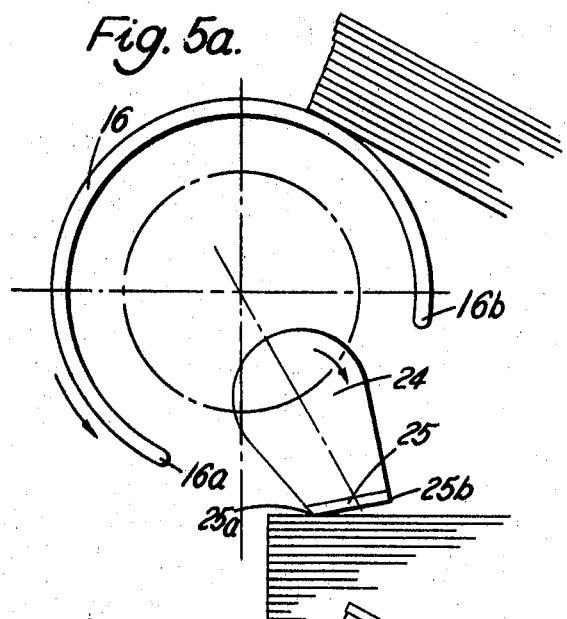

FIGURE 5a shows the approach of the plate 25 towards the stack in which position the source of suction is connected to the port 26 in the plate, the port 36 in the disc valve 30 being in register with the port 29.

Figure 5B:
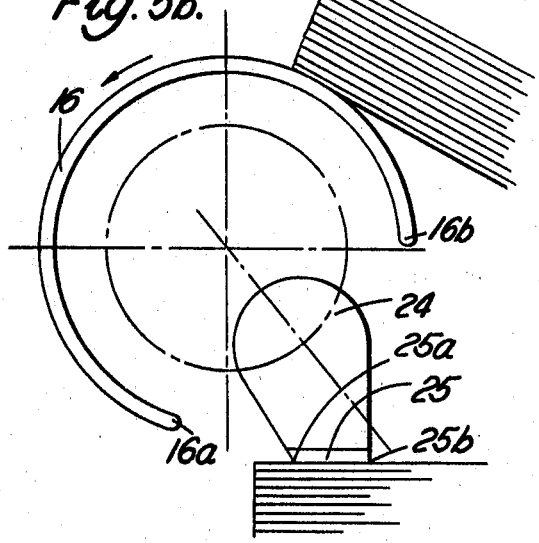
Figure 5C:
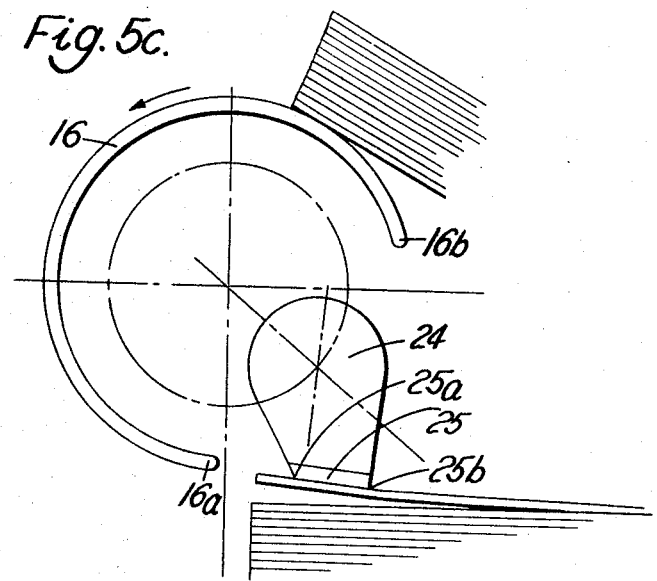
Figure 5D:
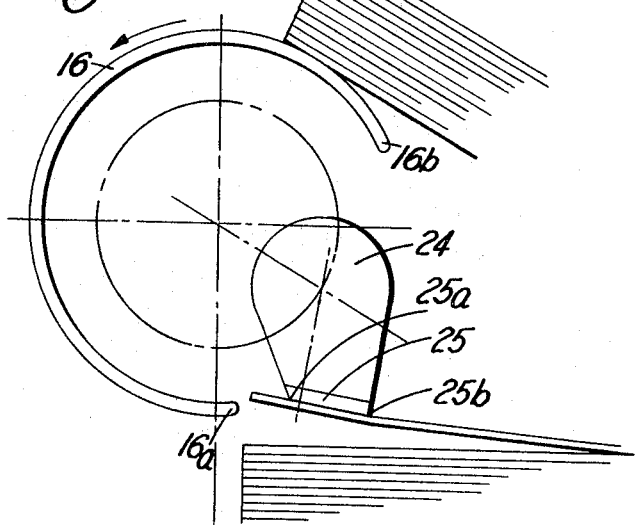

In FIGURE 5b the suction head is about to rise and the remaining figures show how the sheet bends while it is rising. They also show how the leading edge 16a of the cut out in the drum passes between the deflected sheet and the sheet below it.

FIGURE 5f shows the approximate position of the parts when the vacuum supply is cut off by means of the disc 30.

These figures also show how the previously deflected sheets are supported by the upper surface of the drum maintaining a gap between the deflecting sheets and the remainder of the stack, and which deflected sheets eventually fall off the trailing edge 16b of the drum on to a part of the suction head 24 as the drum continues to rotate.

As referred to above the angle of the bend about the trailing edge 25b of the plate 25 requires to be varied according to the stiffness of the material of the sheets to be counted in order to ensure the freeing of any sheet which might have adhered to the underside of the sheet being lifted by the suction chamber. With a comparatively flexible material the corners of the sheets must be given an appreciably greater bend than for a stiffer material and this variation is obtained by altering the fixed position of the toothed annulus 10.

Repositioning of the annulus 10 in the direction of drum rotation, whilst still engaging the pinion 22, has the effect of retarding the position at which the plate 25 is in the horizontal (pick-up) position. Repositioning annulus 10 in the direction opposite to that of drum rotation has the effect of advancing the pick-up position. In the first instance, therefore, pick-up is made when the plate 25 has travelled substantially beyond the lowermost position and its upward motion, due to rotation of the drum, is relatively large in relation to its angular motion caused by the rotation of spindle 18 about its own axis. As a result, the effective angle of bend imparted to the sheet about the trailing edge of the vacuum chamber is relatively smaller. In the second instance (i.e. advancing the pick-up position), the plate 25 is nearer to its lowermost position with the result that its upward movement is reduced in relation to the angular movement, thus relatively greater angle of bend is imparted to the sheet about the trailing edge of the plate 25.

In addition, it is sometimes necessary on thin and flexible sheets to impart still more bending to free an under adhering sheet by fitting a suitable shaped plate 25.

FIGURE 6 shows the mechanism associated with the counter head whereby the attitude of the counter with respect to the stack of sheets may be adjusted in a horizontal plane.

The mechanism, which is also shown in the lower part of FIGURE 2, comprises a horizontal arcuate cross beam 90 which is bolted to the lower wall of the main body 13 of the counter head as shown in FIGURE 2. Secured to opposite ends of the beam 90 are downwardly extending pivot pins 91 on each of which is pivotally mounted a two-part lever arm 92. One end of each lever arm is formed with a pair of spaced upstanding lugs 93 between which is pivotally mounted by means of a horizontal pivot pin 94 a forked arm 95. A roller 96 is rotatably mounted between the limbs of each forked arm, so as to rotate about a horizontal axis.

The pivot pin 94 is secured to the fork arm 95 but is rotatable in bearings in the lugs 93. An adjustable collar 97 is secured to each pivot pin 94 by means of a grub screw 98 and a helical torsion spring 99 encircles each pivot pin 94 between the collar 97 and one of the lugs 93. The arrangement is such that the pivot pin 94 is normally held against rotation in its bearings in the lugs 93, by means of the torque exerted thereon by the torsion spring 99, but the fork arm 95 may swing upwardly about the pivot pin 94 when a sufficient upward force is applied to the roller 96 for the purpose described later.

The other end of each lever arm 92 has secured thereto a block 100 which is formed with a horizontal threaded bore. A lug 101 is formed on the underside of the arcuate beam 90 at the centre thereof and is formed with a horizontal bore in which is rotatable a spindle 102. The spindle is restrained from axial movement through the bore in the lug 101 by clamping rings 103 encircling and secured to the spindle on opposite sides of the lug 101. The spindle 102 is formed with two threaded portions 104 which engage the threaded bores in the blocks 100. One end of the spindle 102 is provided with a manipulating member 105 and the two threaded portions 104 of the spindle 102 are threaded in opposite directions so that as the spindle 102 is rotated by means of the manipulating member 105 the two blocks 100 move towards or away from one another according to the direction of rotation of the spindle. It will be seen therefore that as the spindle is rotated the two rollers 96 on the opposite ends of the lever arms 92 also move towards or away from one another.

As will be seen from FIGURE 6 the rollers 96 are arranged to engage the upright sides 106 of a stack of sheets. As the rollers 96 are moved towards or away from one another whilst still remaining in contact with the faces 106 of the stack of sheets then the arcuate beam 90 will be moved away from or towards the corner of the stack of sheets. Since the arcuate beam 90 is secured to the counter head, it will be seen that the whole counter head can thus be adjusted in a horizontal plane towards or away from the corner of the stack of sheets by appropriate rotation of the spindle 102. This horizontal movement of the counter head is permitted due to the freedom of horizontal movement of the head on the supporting structure 69 as described above in relation to FIGURE 3. As described above, since the counter head is urged towards the corner of the stack of sheets by means of the "Tensator" device 62, the rollers 96 are urged against the upright faces of the stack of sheets and remain in contact therewith even if the surfaces are irregular down the height of the stack.

Since the rollers 96 are urged into engagement with the sides of the stack of sheets the whole assembly of the counter head will tend to align itself symmetrically with respect to the corner of the stack of sheets due to the free pivotal movement of the counter head about the upright spindle 41 as described above with reference to FIGURES 2 and 3. Thus as the counter head moves downwardly along the corner of the stack of sheets the rollers 96 will tend automatically to align the head with the corner of the stack of sheets. Should the stack of sheets be seriously out of alignment in the lower parts thereof it may be that the rollers 96 will not be able to accommodate the misalignment. In this case it will be necessary for an operator of the machine to unclamp the spindle 67 referred to above and shown in FIGURE 3 so that the counter head may be swung about the spindle 67 and realigned accurately with the corner of stack of sheets.

It will be appreciated that, since the rollers 96b lie below the drum 16, they will reach the bottom of the stack and strike its support before the counter head has counted all the sheets in the stack. The fork arms 95 carrying the rollers 96 are therefore arranged to swing upwardly in relation to the counter head, as described above, so that the counter head can continue to move downwardly after the rollers 96 have been arrested by the stack support. It must be ensured however that the stack support does not extend sufficiently far beyond the sides of the stack to foul the lever arms 92. A clamping screw (not shown) passes through the upper wall 69 of the supporting structure 59 and may be screwed down against part of the upper wall 56 of the carrier 46 so as to restrain the carrier 46 against movement towards the corner of the stack of sheets when the fork arms 95 and rollers 96 are deflected upwardly.

Means will now be described whereby the downward movement of the counter head is controlled so that the vertical position of the drum 16 with respect to the corner of the stack of sheets is automatically adjusted as the apparatus is in operation.

Referring to FIGURE 2 there is mounted on an end wall of the main body 13 of the counter head a block 80 in which there is slidable a cylindrical carrier 81 for a photo-electric cell device 82. A light source 83 (shown in chain lines in FIGURE 2) is mounted on a bracket 84 on the opposite end of the wall of the main body 13, the arrangement being such that the beam of light from the light source 83 is parallel with the axis of the drum 16 and impinges on the photo-electric cell device 82. The carrier 81 for the photo-electric cell device is slidable in the mounting block 80 and its axial position within that block may be adjusted by means of a hand operated rack and pinion mechanism 85. The mounting 84 for the light source 83 is pivotally connected to its end wall so that the light source may be adjusted to a position opposite the photo-electric cell device. By these means the beam of light from the light source may be adjusted towards or away from the axis of rotation of the drum 16. The photo-electric cell is connected in known manner with a switch controlling the aforementioned motor driving the lead screw 79 by means of which the counter head is moved downwardly, the arrangement being such that when the beam of light emitted from the light source 83 is obscured by the stack of the sheets so that it no longer falls on the photo-electric cell device 82, the motor is de-energised and the counter head is stationary until sufficient sheets have been lifted from the top of the stack and transferred to the upper surface of the drum 16 and the beam of light is no longer obscured. When the beam of light once more falls on the photo-electric cell it is arranged to actuate a switch to cause the electric motor to be energised again so that the counter head resumes its downward travel.

The counting of the sheets is effected by means of a known form of electrical counting device, shown diagrammatically at 107 in FIGURES 1 and 2, which is normally supplied with an electrical pulse at every revolution of the drum 16, the pulses being controlled by a known form of magnetically operated switch 108 connected to the shaft 37 and is arranged to be operated at each revolution of that shaft. As described above, the shaft 37 rotates in synchronism with the drum 16.

It will be appreciated that instead of the magnetically operated switch, any other suitable device such as a mechanically operated or light sensitive device could be used to effect the transmission of a pulse to the counter at every revolution of the drum.

To ensure that a pulse is not transmitted to the electrical counter, in the event that the drum 16 rotates without lifting a sheet, a photo-electric detector is arranged, as shown in FIGURE 2, to act on an electrical gate to prevent the transmission of a pulse to a counter when a sheet is not lifted.

Referring to FIGURE 2 there are mounted on the main body 13, a light source 38 and a photo-cell assembly 39. The drum 16 is formed with apertures 5, 6 and the suction head 24 is formed with an aperture 42. The internal surface of the drum is light reflecting. The arrangement of the apertures 5 and 6 and the dispositions of the light source 38 and photo-cell 39 are such that in a certain position of the drum 16 (the position shown in FIGURE 2) the beam of light from the light source 38 passes through the apertures 40 and 42 and impinges on the face of the corner of the sheet 43 being lifted by the drum and does not reach the photo-cell assembly 39. Should the drum not have lifted the corner of a sheet the beam of light from the light source is reflected by the inner surface of the drum and passes through the aperture 41 in the drum to fall on the photo-cell assembly 39. Under these conditions the illumination of the photo-cell by the light beam is arranged to operate a relay (not shown) in the counter 107 so as to prevent the next pulse caused by the mechanical switch referred to above from being counted. A projection 8 is formed on the suction head 24 to prevent the corner of the topmost sheet curling upwardly out of the path of the light beam.

As described in my copending U.S. application Serial No. 382,726, filed July 15, 1964. means are provided for relieving the drum 16 of the weight of the deflected sheets which have been transferred to the upper side thereof.

I claim:
1. Apparatus for successively separating at least a part of each of a number of sheets from a neighboring sheet in a stack without disrupting the stack as a whole, comprising
   (a) a support for the stack of sheets,
   (b) a sheet deflecting head comprising a carrier mounted to rotate in one direction about an axis substantially parallel to the planes of the sheets in the stack,
   (c) a suction device mounted on the carrier to rotate in one direction relatively to the carrier about an axis parallel to and spaced from the axis of rotation of the carrier,
   (d) a suction opening on the suction device arranged during a portion of each rotation to overlie part of a sheet in the stack and cause a part of that sheet to cling to the suction device and, due to the rotation of that device, to be deflected from an adjacent sheet to form a gap,
   (e) a part of the carrier, separate from the suction device, which part is arranged, as the carrier rotates, to enter the gap and move the sheet from one side of the deflecting head to the other so that the suction opening may overlie a part of the next sheet in the stack during a portion of its next rotation,
   (f) means for effecting relative movement between the deflecting head and the support for the stack in a direction substantially at right angles to the planes of the sheets, and
   (g) means for normally operating a counter each time the carrier rotates about its axis but the effectiveness of which means on the counter is dependent on the deflection of a sheet by the deflecting head, so that the counter is only operated when a sheet is deflected.

2. Apparatus according to claim 1 wherein means are provided for rendering the counter temporarily inoperable, which means comprise a light sensitive device moving with the deflecting head and disposed in the path of a beam of light from a light source, also moving with the deflecting head, the arrangement being such that as a part of a sheet is moved it obscures the beam of light from the light sensitive device at the time the counter is operated, so that in the event a sheet is not deflected by the suction device the beam of light falls on the light sensitive device which is arranged to render the counter temporarily inoperable when so illuminated.

3. Apparatus for successively separating at least a part of each of a number of sheets from a neighbouring sheet in a stack without disrupting the stack as a whole, comprising (a) a support for the stack of sheets,
(b) a sheet deflecting head comprising a carrier mounted to rotate in one direction about an axis substantially parallel to the planes of the sheets in the stack,
(c) a suction device mounted on the carrier to rotate in one direction relatively to the carrier about an axis parallel to and spaced from the axis of rotation of the carrier,
(d) a suction opening on the suction device arranged during a portion of each rotation to overlie part of a sheet in the stack and cause a part of that sheet to cling to the suction device and, due to the rotation of that device, to be deflected from an adjacent sheet to form a gap,
(e) a part of the carrier, separate from the suction device, which part is arranged, as the carrier rotates, to enter the gap and move the sheet from one side of the deflecting head to the other so that the suction opening may overlie a part of the next sheet in the stack during a portion of its next rotation,
(f) means for traversing the deflecting head from one end of the stack to the other in a direction substantially at right angles to the planes of the sheets, and
(g) means responsive to the position of the sheet deflecting head in relation to a sheet on which the suction device is about to operate,
(h) which responsive means are arranged to control the means for traversing the head from one end of the stack to the other so that as the gap moves along the stack due to successive sheets being deflected by the head, the head also moves along the stack with said gap owing to the head being located, by said responsive means, in relation to the sheet on which it is about to operate.

4. Apparatus according to claim 3 wherein the means responsive to the position of the sheet deflecting head comprise a light source and a light sensitive device moving with the sheet deflecting head and disposed on opposite sides of the stack so that the beam of light from the light source passes through said gap created by the deflecting head, which light sensitive device is so connected to the traversing means that the traversing means are energized while the beam of light is falling on the light sensitive device so that as the deflecting head deflects successive sheets causing the gap to move along the stack, the head is maintained in a predetermined position in relation to the moving gap and hence to the sheet on which the suction device is about to operate.

5. Apparatus for successively separating at least a part of each of a number of sheets from a neighbouring sheet in a stack without disrupting the stack as a whole, comprising (a) a support for the stack of sheets,
(b) a sheet deflecting head comprising a carrier mounted to rotate in one direction about an axis substantially parallel to the planes of the sheets in the stack,
(c) a suction device mounted on the carrier to rotate in one direction relatively to the carrier about an axis parallel to and spaced from the axis of rotation of the carrier,
(d) a suction opening on the suction device arranged during a portion of each rotation to overlie part of a sheet in the stack and cause a part of that sheet to cling to the suction device and, due to the rotation of that device, to be deflected from an adjacent sheet to form a gap,
(e) a part of the carrier, separate from the suction device, which part is arranged, as the carrier rotates, to enter the gap and move the sheet from one side of the deflecting head to the other so that the suction opening may overlie a part of the next sheet in the stack during a portion of its next rotation,
(f) means for effecting relative movement between the deflecting head and the support for the stack in a direction substantially at right angles to the planes of the sheets, and
(g) means for tilting the sheet deflecting head about a substantially horizontal axis transverse to the axes of rotation of the suction device and carrier so that those axes may be adjusted to a position parallel to the planes of the sheets in the stack.

6. Apparatus for successively separating at least a part of each of a number of sheets from a neighbouring sheet in a stack without disrupting the stack as a whole, comprising (a) a support for the stack of sheets,
(b) a sheet deflecting head comprising a carrier mounted to rotate in one direction about an axis substantially parallel to the planes of the sheets in the stack,
(c) a suction device mounted on the carrier to rotate in one direction relatively to the carrier about an axis parallel to and spaced from the axis of rotation of the carrier,
(d) a suction opening on the suction device arranged during a portion of each rotation to overlie part of a sheet in the stack and cause a part of that sheet to cling to the suction device and, due to the rotation of that device, to be deflected from an adjacent sheet to form a gap,
(e) a part of the carrier, separate from the suction device, which part is arranged, as the carrier rotates, to enter the gap and move the sheet from one side of the deflecting head to the other so that the suction opening may overlie a part of the next sheet in the stack during a portion of its next rotation,
(f) means for effecting relative movement between the deflecting head and the support for the stack in a direction substantially at right angles to the planes of the sheets, and
(g) means for automatically adjusting the position of the sheet deflecting head whilst retaining the axes of rotation of the suction device and carrier parallel to the planes of the sheets in the stack, so as automatically to maintain a constant relation between the deflecting head and successive sheets in the stack in the event of edges of successive sheets being out of alignment.

7. Apparatus for successively separating at least a part of each of a number of sheets from a neighbouring sheet in a stack without disrupting the stack as a whole, comprising (a) a fixed support for the stack of sheets,
(b) a sheet deflecting head comprising a carrier mounted to rotate in one direction about an axis substantially parallel to the planes of the sheets in the stack,
(c) a single suction device mounted on the carrier to rotate in one direction relatively to the carrier about an axis parallel to and spaced from the axis of rotation of the carrier,
(d) a suction opening on the suction device arranged during a portion of each rotation to overlie part of a sheet in the stack and cause a part of that sheet to cling to the suction device and, due to the rotation of that device, to be deflected from an adjacent sheet to form a gap,
(e) a part of the carrier, separate from the single suction device, which part is arranged, as the carrier rotates, to enter the gap and move the sheet from one side of the deflecting head to the other so that the suction opening may overlie a part of the next sheet in the stack during a portion of its next rotation, and
(f) means for traversing the deflecting head from one end of the stack to the other in a direction substantially at right angles to the planes of the sheets, as the deflecting head operates upon successive sheets in the stack.

8. Apparatus according to claim 7 wherein the suction device is formed with an edge extending in the same general direction as said axes and means are provided for imparting rotation to said carrier and to said suction device about their axes in such directions and such a speed that when the sucton device moves the sheet away from a neighbouring sheet it also bends the sheet at the locality of said edges.

9. Apparatus according to claim 7 wherein the suction device is rotated relative to the carrier in the opposite sense to the rotation of the carrier itself.

10. Apparatus according to claim 7 wherein the carrier for the suction device comprises a shaft having fixed to it a pinion engageable with a gear wheel concentric with the axis about which the carrier rotates.

11. Apparatus according to claim 10 wherein said gear wheel comprises an internally toothed rack.

12. Apparatus according to claim 10 wherein the gear ratio between the gear wheel and pinion is such that the pinion is rotated twice about its axis as it executes one revolution around the gear wheel.

13. Apparatus according to claim 10 wherein the gear wheel is stationary and is adjustable about its axis on a fixed part of the apparatus, for the purpose described.

14. Apparatus according to claim 7 wherein the carrier comprises a drum formed with a slot through which the suction device may project, one edge of the slot constituting the aforesaid part of the carrier and being arranged to engage one side of the corner of a deflected sheet so as to maintain said gap whilst said suction device is rotating away from the other side of the deflected sheet and into the gap on said one side of the sheet opposite the corner of the next sheet to be deflected.

15. Apparatus according to claim 7 wherein rotary valve means are associated with the suction device, which valve means are automatically actuated by rotation of one of said parts so that the suction device is placed into communication with a source of suction when it has been brought opposite and in contact with one of the sheets and is cut off from communication with the source when the sheet has been deflected and said means for maintaining the gap have come into operation.

16. Apparatus according to claim 7 wherein means are provided for operating a counter each time a sheet is moved by the deflecting head.

References Cited by the Examiner
UNITED STATES PATENTS

| | | | |
|---|---|---|---|
| 1,412,812 | 4/1922 | White | 271—62 |
| 2,593,181 | 4/1952 | Pritchard | 271—27 |
| 2,810,575 | 10/1957 | Holmen | 271—27 |
| 2,911,216 | 11/1959 | Richardson | 271—27 |
| 2,912,242 | 11/1959 | Richardson. | |
| 3,149,835 | 9/1964 | Branscome | 271—62 |

M. HENSON WOOD, JR., *Primary Examiner.*

J. N. ERLICH, *Assistant Examiner.*